Jan. 29, 1946.  G. EHRENBERG  2,393,623
AUTOMOBILE
Filed July 14, 1943  3 Sheets-Sheet 1
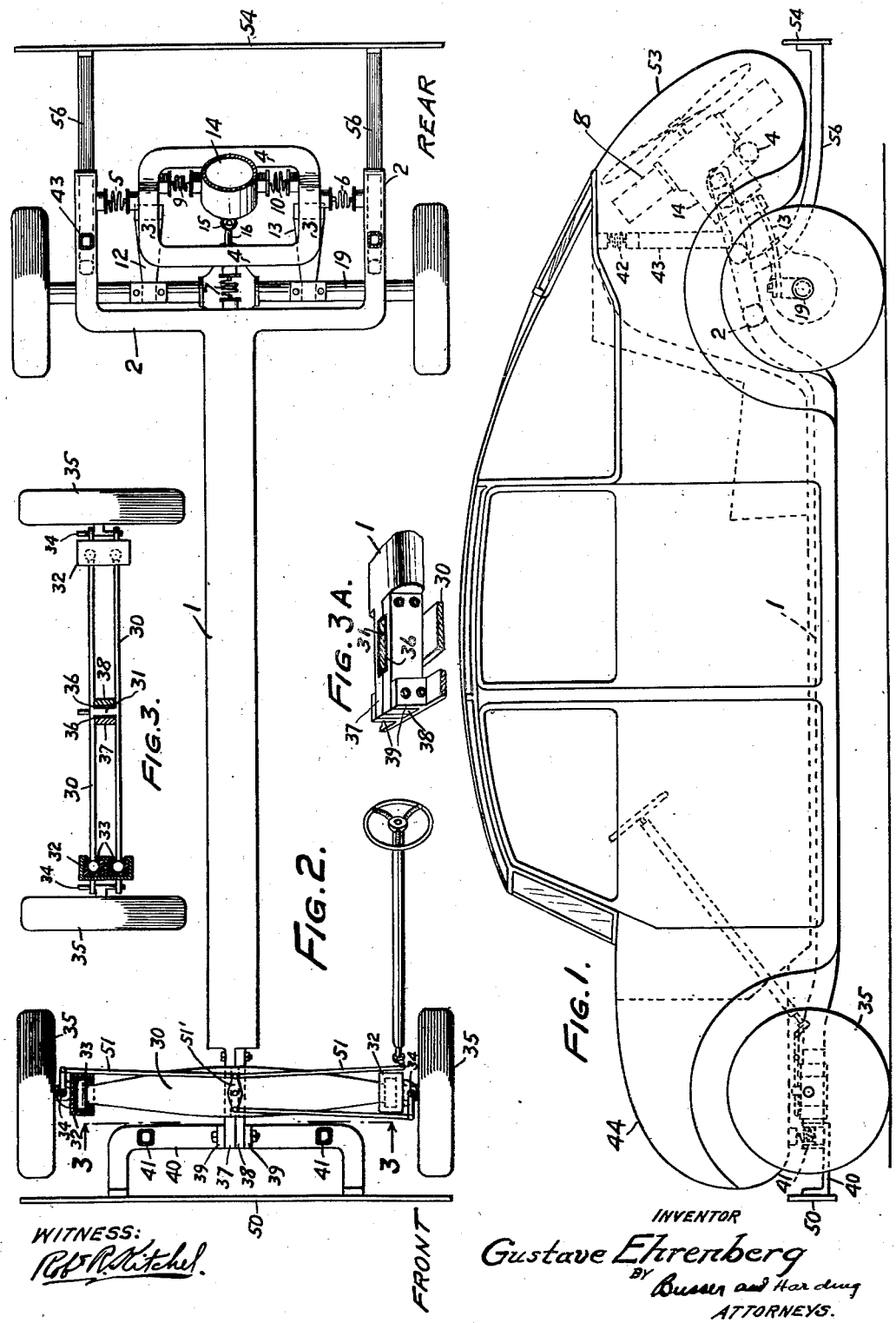
INVENTOR
Gustave Ehrenberg
BY Busser and Harding
ATTORNEYS.

Jan. 29, 1946. G. EHRENBERG 2,393,623
AUTOMOBILE
Filed July 14, 1943 3 Sheets-Sheet 2
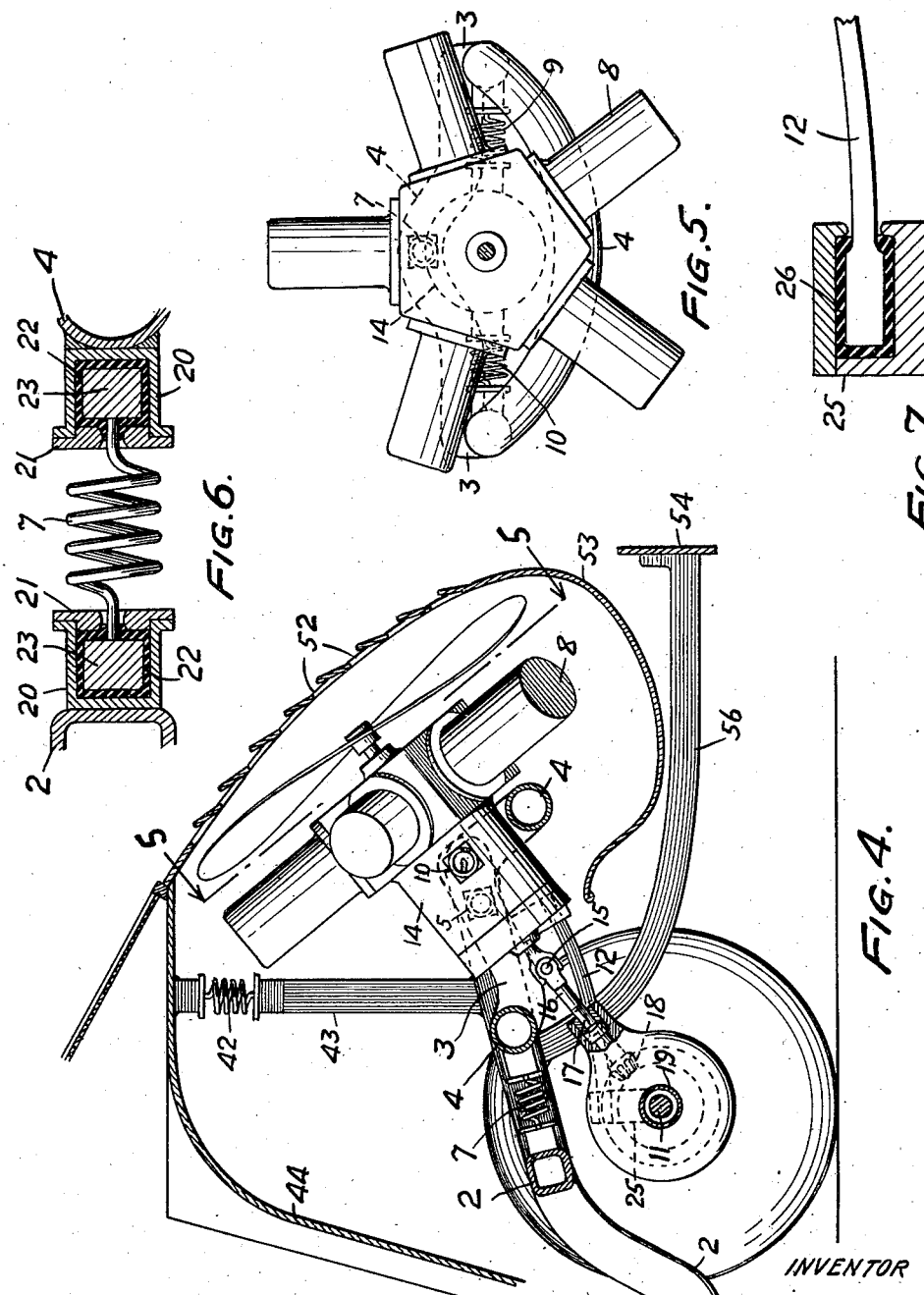
INVENTOR
Gustave Ehrenberg
BY
Busser and Harding
ATTORNEYS.
WITNESS:
Rob R Kitchel Jan. 29, 1946.　　　G. EHRENBERG　　　2,393,623
AUTOMOBILE
Filed July 14, 1943　　　3 Sheets-Sheet 3
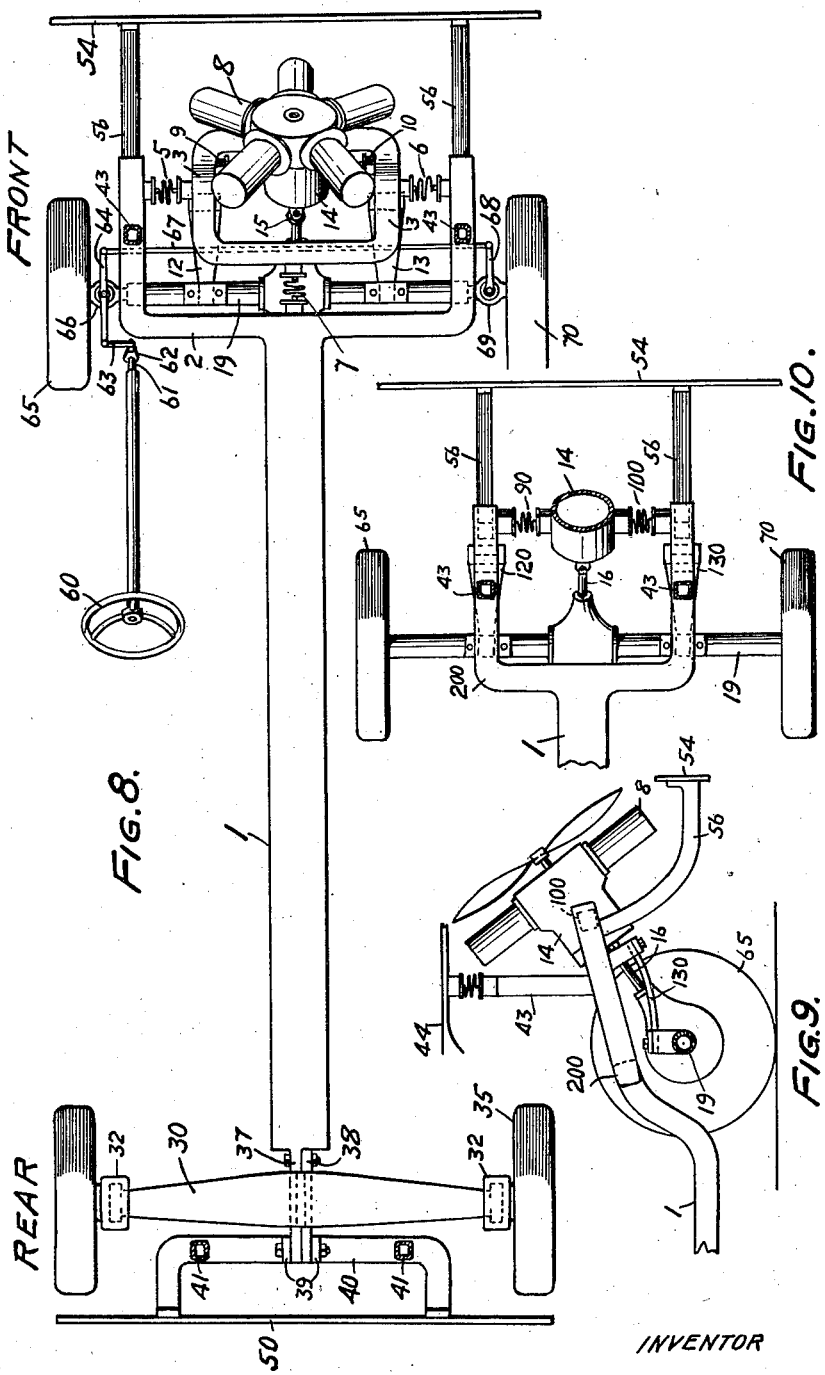
WITNESS:
INVENTOR
Gustave Ehrenberg
BY
ATTORNEYS.

Patented Jan. 29, 1946

2,393,623

UNITED STATES PATENT OFFICE 2,393,623

AUTOMOBILE

Gustave Ehrenberg, Philadelphia, Pa.

Application July 14, 1943, Serial No. 494,597

12 Claims. (Cl. 180—64)

My invention relates to automobiles. The object of the invention is to provide a new and improved automobile of the type in which the engine and driving connections are mounted at the same end of the car. The invention comprises a novel construction and arrangement for supporting, from the chassis, the motor, transmission gearing, universal joint, drive shaft, differential gears and power transmission axle and wheels. It also comprises a novel axle and support therefor at the opposite end of the chassis. The details of construction, and their practical advantages, will be apparent from the following description read in connection with the accompanying drawings, in which—

Fig. 1 is a side view of the complete automobile.

Fig. 2 is a plan view of the chassis and of all essential parts of the automobile, including wheels, axles, transmission gear housing, engine (completely cut away to give a clearer view) and part of the driving connections; but omitting the body and top.

Fig. 3 is a front view of the front axle and wheels, taken on the line 3—3 of Fig. 2.

Fig. 3A is a detail perspective view of the center support for the front axle.

Fig. 4 is an enlarged side view of the rear of the chassis and the means suspended therefrom for supporting the engine, the axle and the driving connections from the engine.

Fig. 5 is a section on the line 5—5 of Fig. 4.

Fig. 6 is a detail view, partly in section, of the coil springs and the means for securing them to the parts that they connect.

Fig. 7 is a detail, partly in section, showing the connection between one of the axle-supporting leaf springs and its supporting (or supported) member.

Fig. 8 is a plan view of a modification of the construction shown in Fig. 2.

Figs. 9 and 10 are side and plan views, respectively, of a modified engine-supporting means.

The tubular frame 1 of the chassis is at its rear end shaped to form a yoke 2 which spring-supports the engine-supporting frame, the latter being located between the end arms of the yoke, as shown in Fig. 2. The engine frame is of tubular metal and (in plan) approximates in form a rectangle, whose shorter sides 3 extend longitudinally of the chassis and are shaped, in side view, as shown in Fig. 4.

The engine frame is supported by coil springs 5, 6 and 7, springs 5 and 6 extending between the arms of the yoke 2 and the end bars 3 of the engine frame, and spring 7 extending between the cross arm of the yoke 2 and the inner of the two longer cross bars 4 of the engine frame.

Within the engine frame the engine 8 is supported by means of coil springs 9 and 10 extending from the side bars 3 of the engine frame.

The housing 19 for the differential gears and axle 11 is spring-connected to the engine frame by means of two leaf springs 12 and 13 extending between said housing and lugs depending from the cross bars 3 of the engine frame.

The engine shown is of the multi-cylinder radial type, comprising preferably an odd number of cylinders, five being shown.

Secured to the engine is the casing 14 for the transmission gearing, which, through a universal joint 15, drives a shaft 16, which has a slip joint connection 17 with the shaft of the transmission pinion 18. By means of this slip joint connection, only torque, and no longitudinal force, is transmitted.

The method of supporting the ends of the springs is of some importance. A preferred construction is shown in Fig. 6. The support for spring 7 is shown as illustrative of all of the supports. Secured to the cross arm of the yoke 2 is a case or box 20 the outer wall 21 of which has a central hole, through which one end of the spring 7 extends. The end of the spring is secured to, or enlarged to form, a head or block 23. The casing is provided with an inner lining or wall 22 of rubber within which the block 23 is embedded. A similar connection is provided between the other end of the spring and the cross arm 4 of the engine frame.

Each end of each of the axle-supporting leaf springs 12 and 13 is secured, as shown in Fig. 7, in a manner similar to that described for holding the ends of the coil springs, in a box or casing 25, secured to the housing 19 and having an inner lining or wall of rubber 26 which surrounds and tightly grips the thickened inner end of the leaf spring.

In the construction shown in Figs. 6 and 7 and above described, the metal spring tends to absorb the low frequency vibrations, while those of higher frequency that may be transmitted through the metal spring are absorbed by the rubber.

The above described construction and arrangement (not necessarily, however, including the specific means described for supporting the ends of the springs) provide a twin-acting shock absorber, the effectiveness of which the following explanation will make clear. Consider a rigid object mounted so as to be free to rotate about a horizontal axis. In general when the object is struck there will be two effects; one a rotation of the object about this axis, the other a jarring of the mount. There is always, however, one point through which a blow may be delivered which will cause only the first of these effects. This point is called the center of percussion associated with a particular point of suspension called the center of suspension.

Considering the wheels, axle, motor frame, motor with transmission and the driving parts as a unit, all blows experienced by this unit due to jarring or bumping of the power transmitting wheels will be applied at the point of contact between the wheels and the road. This point is then the center of percussion. By springing this unit at the corresponding center of suspension by springs 5 and 6, no jars will be transmitted to the chassis as a result of the jarring of the wheels. By similarly springing the motor with its transmission to the motor frame, jarring of the motor is minimized. The construction as an entirety thus acts, as above stated, as a twin acting shock absorber and more nearly completely avoids transmission of shock to the automobile than has heretofore been obtained.

It is well to note that in automobiles of the usual type, the body is removed by sets of springs or shock absorbing supports, once from the motor and once from both front and rear wheels. In my invention, by sets of spring supports, the body is removed three times from the power transmission wheels, three times from the motor and twice from the wheels at the opposite end of the chassis. The above number of times the body is removed by sets of springs from the aforementioned parts does not take into account the compounding of the springs rubber-supported at each end.

Another important feature of the invention is a straight line drive from the motor transmission gears to the axle differential gears. The usual straight line drive is achieved only by placing the conventional motor at the opposite end of the chassis from the drive wheels and tilting it slightly to line it with a gently sloping drive shaft. The gentle slope of the drive shaft is a direct consequence of the distance separation of power transmission wheels from the motor transmission gears. When the motor and power transmission wheels are at the same end of the chassis, a straight line drive is not used. If it were, the conventional motor would then jut into the air or too far overhang the front or rear of the chassis. Instead, it is deemed necessary to place the motor sideways or have it project directly back into the car, in either case with the transmission gears usually above the axle differential gears; and an extra set of gears are used merely to change direction of the transmission power shaft by approximately 90° or more to come in line with the axle differential drive shaft.

In my invention, use of the radial engine allows a straight line drive, making unnecessary any extra gearing, and avoiding the serious objection of a motor projecting too far beyond the end of the chassis.

Easily replaceable units of the power drive mechanism are another important feature of my invention. To remove the motor, the only major supports to be disconnected are the springs 9 and 10 at either the motor or the motor frame. To remove the whole power unit, including the motor, the motor frame, transmission gears with all driving connections, power transmission axle, differential gears and wheels, the only major supports to be disconnected are springs 5, 6 and 7 at either the yoke or the motor frame.

A practicable and somewhat simplified modification, but one which is less desirable than the construction shown in Figs. 2, 3, 4, 5 and 8, is shown in Figs. 9 and 10. Instead of spring-supporting the engine from an engine frame, which in turn is spring-supported from the yoke, the engine frame may be omitted and the engine may be supported, by means of springs 90 and 100 (corresponding to springs 9 and 10), directly from the arms of the yoke, as shown in Figs. 9 and 10. The housing 19 for the differential gears and axle is spring-connected, by means of springs 120 and 130 (corresponding to springs 12 and 13), to lugs depending from the arms of the yoke. The yoke in Figs. 9 and 10 is numbered 200. The arms of the yoke 200 are brought closer together than the arms of the yoke 2, to enable them to directly spring-support the engine.

The front axle of the chassis (see Figs. 2, 3 and 3A) comprises two leaf springs 30, 30, one above the other, secured one to the other at their centers by a strut 31 and with each of their ends secured, as shown in Figs. 2 and 3 (in a manner similar to that described for holding the ends of the coil springs 5, 6 and 7 and leaf springs 12 and 13), in a box or casing 32 having an inner lining or wall of rubber 33 which surrounds and tightly grips the pin-shaped ends of the leaves; the two boxes 32 at each end being secured together and having ears through which extends the spindle 34 carried by the wheel 35. The central strut or partition 31 is encased in rubber 36, which is gripped securely in a slot formed in a metal bar extending from the end of the tubular chassis 1. This bar is most conveniently formed by making it of two longitudinally abutting bars, one 37 of which is integral with the chassis and the other 38 of which is a separate bar bolted at its rear end to the bar 37; the two bars at the front end being confined between flanges 39 on a front frame 40; the bars 37 and 38 and the flanges 39 being bolted together. The slot through which extends the rubber-encased partition 31 is conveniently formed by shallow recesses in opposing faces of the bars 37 and 38, which thus act as jaws to clamp between them the central part of the front axle. The above described construction and arrangement form both axle and wheel springs and independently support each wheel. When either wheel is thrust or bumped above or below the level of the other wheel, it is constrained to move in a plane nearly parallel to its normal position.

On the top of the spring axle is mounted the cross rods 51 of the steering mechanism. The cross rods are connected to a lever 51' mounted at the center of the spring axle, this lever, in turn, being connected to the shaft of the steering wheel column.

The frame 40 supports the front buffer 50 and also, by means of rubber-encased springs 41, the front of the automobile body 44 on opposite sides of the center of the frame. The rear of the body is supported by similar springs 42 on uprights 43 secured to the end arms of the yoke 2. The body supports are arranged to be closely in a line with, or in a line above, the body's center of gravity. As a direct consequence of this arrangement, the car body when rounding a turn, tends to remain upright, or the bottom of the body will swing toward the convex side of the curve to give a correct banking so as to prevent an occupant from sliding in his seat. In an automobile of the usual type, with the body supports below the body's center of gravity, the top of the body swings to the convex side of the curve, which tends to throw the occupant out of his seat.

The rear of the car is provided with a hood 53, secured to the body, enclosing the engine and transmission gear box.

A rear buffer 54 may be conveniently secured by arms 56 to the yoke 2.

The arrangement of the motor, the power transmission wheels and the driving connections between them at the rear of the chassis and of the steering wheels at the front is a preferred arrangement but not one to which my invention is limited. An entirely practicable different arrangement is one in which all the specified elements are arranged at the front of the car. Such an arrangement is shown in Fig. 8. Except as hereinafter described, the details of construction are the same as those hereinbefore described, and therefore the same reference numerals are applied to identical elements. The differences are as follows: The rear wheels 35 are supported from the rear axle 30 so as to turn on fixed axes. The steering mechanism is mounted as a unit on the front axle. A lever 64, turnable from steering wheel 60 and its shaft 61, through arm 62 and link 63, is connected with one of the front wheels 65 at the universal joint 66. A cross bar 67 connects lever 64 with a lever 68, which is connected, at the universal joint 69, with the other front wheel 70. The connections between the steering mechanism and the front wheels need not be further described, since they are old and known in the art; that is, there is no novelty, per se, in connecting the steering mechanism with the power driven wheels, Fig. 8 merely illustrating the adaptability of my invention to such an arrangement.

What I claim and desire to protect by Letters Patent is:

1. An automobile comprising a chassis, a yoke at one end thereof, a power transmitting axle, a motor, power transmitting connections between the motor and axle comprising driving and driven parts, a universal joint between the driving and driven parts of the driving connection, a driven element rotatable with said driven part but slidable relative thereto in the direction of the center of the motor, and means spring-supporting said motor, connections and axle from said yoke.

2. An automobile comprising a chassis, a motor-carrying frame spring-supported from one end thereof at three points, namely, on a line coincident with the longitudinal center of the chassis, and at two points on opposite sides of the frame equidistant from said longitudinal center line, and a motor spring-supported from said frame at points on opposite sides of the frame equidistant from said longitudinal center line.

3. An automobile comprising a chassis shaped at one end to form a yoke, a motor frame located centrally within the yoke, a spring support between the center of the cross-arm of the yoke and the rear of the motor frame, a spring support between each arm of the yoke and corresponding side of the motor frame, a motor located centrally within the motor frame, and spring supports between said motor and the opposite sides of the motor frame.

4. An automobile comprising a chassis, a power transmitting axle and its housing, a motor-carrying frame spring-supported from one end of the chassis at three points, namely, on a line coincident with the longitudinal center of the chassis, and at two points on opposite sides of the frame equidistant from said longitudinal center line, a motor spring-supported from said frame at points on opposite sides of the frame equidistant from said longitudinal center line, and means supporting the axle and its housing from the motor-carrying frame, said means comprising springs between the motor-carrying frame and the axle housing on opposite sides of and equidistant from the longitudinal center line of the chassis.

5. An automobile comprising a chassis, a yoke at one end of the chassis having a cross arm and rearwardly extending end arms, a motor-carrying frame, having front, rear and side members, within the yoke, coil springs by which the motor-carrying frame is supported from the chassis, one spring between the center of the cross bar of the yoke and the center of the front member of said frame and the other springs between the end arms of the yoke and the respective side members of said frame.

6. An automobile comprising a chassis, a power transmitting axle and its housing, a yoke at one end of the chassis, a motor-carrying frame spring-supported from and within said yoke, and axle-supporting leaf springs between the engine frame and the axle housing, said leaf springs being located on opposite sides of, and equidistant from, the longitudinal center line of the chassis.

7. An automobile comprising a chassis, a motor-carrying frame spring-supported from one end of the chassis, and a motor spring-supported in the motor-carrying frame; a plurality of said spring supports each comprising boxes secured respectively to the supporting element and the supported element, said boxes having central holes in their opposite walls, each of said boxes having an enclosed body of rubber, and a coil spring between the boxes, the ends of the coil springs being embedded in said rubber body.

8. An automobile comprising a chassis, a power transmitting axle and its housing, a motor-carrying frame spring-supported from one end of the chassis, and means supporting the axle from the motor-carrying frame; said means including leaf springs extending between the motor-carrying frame and said housing on opposite sides of, and equidistant from, the longitudinal center line of the chassis, boxes secured to said housing and motor-carrying frame respectively, and a body of rubber enclosed within each box, the ends of each leaf spring extending through holes in the boxes and embedded in said rubber body.

9. An automobile comprising a chassis, a motor-carrying frame, means supporting the motor-carrying frame from the chassis comprising like spring supports between them on opposite sides of and equi-distant from the longitudinal center line of the chassis, and means supporting the motor from the motor-carrying frame comprising like spring supports between them on opposite sides of and equidistant from said longitudinal center line.

10. An automobile comprising a chassis, a motor-carrying frame, means supporting the motor-carrying frame from the chassis comprising like spring supports between them on opposite sides of and equi-distant from the longitudinal center line of the chassis, means supporting the motor from the motor-carrying frame comprising like spring supports between them on opposite sides of and equidistant from said longitudinal center line, and a power transmitting axle spring-supported from the motor-carrying frame.

11. An automobile comprising a chassis, a power transmitting axle, a motor-carrying frame, a multiple-cylinder radial engine supported in said frame, driving connections from the motor to the axle, said driving connections including transmission gears, a universal joint between driving and driven parts of the driving connection and a driven element rotatable with said driven part but slidable relative thereto in the direction of the center of the engine; and means supporting the motor-carrying frame from one end of the chassis, said means comprising like springs between them on opposite sides of and equi-distant from the longitudinal center line of the chassis.

12. An automobile comprising a chassis shaped at one end to form a yoke, a power transmitting axle, a housing therefor, a motor, power driven connections between the motor and axle; means supporting the motor between the arms of the yoke, said means comprising springs at points on opposite sides of the motor equi-distant from the longitudinal center line of the chassis; and means supporting the housing from the yoke, including springs on opposite sides of the motor equidistant from said longitudinal center line.

GUSTAVE EHRENBERG.